United States Patent [19]

Hütter et al.

[11] Patent Number: 4,751,592
[45] Date of Patent: Jun. 14, 1988

[54] CASSETTE RECORDER WITH IMPROVED TAPE TENSION CONTROL

[75] Inventors: Heinrich Hütter, Tulln; Heinrich Maly, Kottingbrunn, both of Austria

[73] Assignee: U.S. Philips Corporation, New York, N.Y.

[21] Appl. No.: 9,860

[22] Filed: Feb. 2, 1987

[30] Foreign Application Priority Data

Feb. 4, 1986 [AT] Austria ................................. 268/86

[51] Int. Cl.[4] ...................... G11B 5/008; G11B 15/00; G11B 17/00
[52] U.S. Cl. .......................................... 360/95; 360/85
[58] Field of Search .................. 360/85, 95, 84, 130.2, 360/130.24

[56] References Cited

U.S. PATENT DOCUMENTS 3,871,025  3/1975  Nakamoto ............................. 360/95
3,994,015  11/1976  Tomioka et al. ....................... 360/85

FOREIGN PATENT DOCUMENTS

2007008  5/1979  United Kingdom ................. 360/85

Primary Examiner—John H. Wolff
Assistant Examiner—David J. Severin
Attorney, Agent, or Firm—F. Brice Faller

[57] ABSTRACT

A recording and/or reproducing apparatus (1) for a tape (12) in a cassette (2) includes a tape-guide device (24) for withdrawing the tape (12) from the cassette (2), wrapping the tape around a tape-guide drum (34), and returning the tape into the cassette (2). The tape-guide device (24) includes a supporting ring (49) which is rotatable relative to the tape-guide drum (34), for carrying at least two tape guides (22,23), a first tape-guide (22) keeping the tape (12) wrapped around the tape-guide drum (34) and a second tape-guide (23) which in its operating position keeps the tape (12) away from the tape-guide drum (34). The second tape guide (23) is arranged on a lever (57) which is pivotable relative to the supporting ring (49) under the influence of the tape tension forces exerted on it, against the force of a spring (61) which acts on the lever (57), thus precluding looping of the tape and the occurrence of excessive tape-tension forces during change-over between search modes in different directions and when the tape is returned into the cassette (2).

3 Claims, 3 Drawing Sheets

CASSETTE RECORDER WITH IMPROVED TAPE TENSION CONTROL

BACKGROUND OF THE INVENTION

The invention relates to a recording and/or reproducing apparatus for a tape in a cassette which can be brought into an operating position in the apparatus where the tape is extracted from the cassette. The apparatus includes a tape-guide drum around which, over at least part of its circumferential surface, the tape can be wrapped along a helical path. A tape-guide device is movable between a first and a second operating position, for withdrawing the tape from the cassette and wrapping it around the tape-guide drum and for returning the tape into the cassette. A rotatable supporting ring surrounding the tape-guide drum carries at least two tape-guides which in the first operating position of the tape-guide device engage behind the tape inside the cassette. In the second operating position a first tape-guide keeps the tape wrapped around the tape-guide drum, a first portion of the record carrier extending from the cassette to said first tape-guide via the tape-guide drum and a second portion of the tape extending from said first tape-guide towards the cassette. A second tape-guide keeps the second portion of the tape away from the tape-guide drum, which second tape-guide is mounted on a pivotable lever which is loaded by a spring, which is arranged on the supporting ring and which comprises at least one positioning stop and at least one cam follower. The second tape-guide in one of the two operating positions of the tape-guide device is held in a first position relative to the supporting ring via the lever by means of an actuating-cam surface which cooperates with the cam follower on the lever. In the other one of the two operating positions the second tape-guide can be positioned in a second position relative to the supporting ring via the lever under the influence of the spring by means of a positioning stop which then cooperates with a counter-stop on the supporting ring.

Such an apparatus, which is intended for reproducing video and audio signals, is known from U.S. Pat. No. 3,821,805. In this known apparatus the second tape-guide is arranged on an L-shaped pivotable lever articulated to a one-arm lever which is pivotally mounted on the supporting ring, the two levers constituting a bell-crank-lever system. The L-shaped lever is loaded by a leg spring which acts against the one-arm lever and against the supporting ring. The free end portion of the L-shaped lever carries a pin which functions both as positioning stop and as cam follower. In the first operation position of the tape-guide device, i.e. in the threaded-out condition, said spring urges the pin into a substantially semi-circular recess in the supporting ring, which recess forms the counter stop, so that the second step-guide is positioned in its second position relative to the supporting ring defined by the positioning stop formed by the pin and the recess. In this second relative position the second tape-guide engages behind but is not in contact with the tape. When the tape-guide device is set from its first to its second operating position the pin is retained in the recess under the influence of the spring during a first stage of movement and the pin cooperates with an actuating cam surface during a second stage of movement, which cam surface moves the L-shaped lever against the force of the leg spring via the pin which functions as a cam follower, causing the second tape-guide, which is mounted on the lever, to be set from its second to its first position relative to the supporting ring, which first relative position is defined by the actuating cam surface. In the second operating position of the tape-guide device, i.e. in the threaded-in condition, the second tape-guide occupies its first relative position defined by the actuating-cam surface, in which position it is immobilized by the actuating-cam surface, so that also in the event of looping of tape and in the case that the tape exerts large tape-tension forces on the second tape guide this tape guide remains in its first relative position.

In such known apparatuses it is common practice to provide a search mode in order to enable a desired passage on the tape to be located rapidly, for which purpose the information signals recorded on the tape are scanned while the tape is moved with a high tape speed in the forward direction of the reverse direction between two rolls of tape which are each contained on a reel in the cassette. Searching for a desired passage necessitates search modes in the forward direction and in the reverse direction and, once a desired passage is reached, switching from the last search mode to the normal playback mode or to the stop mode. During switching the attendant change-over of the drive system for the record carrier and the dynamic behaviour of the tape rolls on each reel may give rise to undefined tape-tension conditions and hence to undesired loops in the tape. This is inevitable even if the tape drive system has a tape-tension-control device including tape-tension sensors, because during switching over of the drive system the operating conditions for such a tape-tension-control device are also indeterminate and the loops then occurring are so large that they cannot be detected by the tape-tension sensors of such a tape-tension-control device, which can perform only comparatively small displacements. When such loops are formed it is not unlikely that the tape slips off at least one of the tape-guide elements, which are then immobilized. Such elements include the tape-guide drum, the first and the second tape-guide of the tape-guide device and any further tape-guide elements and signal-transmission heads, so that when the tape is subsequently driven in the search mode it may be deformed and damaged.

Further, when in such known apparatuses the tape is returned into the cassette, i.e. during threading-out when one reel is braked and the other reel is driven to take up the portion of the tape outside the cassette, the instant at which the drive of the latter reel is started and the instant at which the drive of the supporting ring is started should be synchronised exactly. Should the drive of the reel start too early relative to the drive of the supporting ring this premature driving of the tape may give rise to very high tape-tension forces, which may lead to deformation and damage. Conversely, if the drive of the reel is started too late relative to the drive of the supporting ring, this may result in looping and in the tape slipping off at least one of the tape-guide elements, which during subsequent threading-out may lead to an incorrect operation and to deformation and damaging of the tape. As explained above, the risk of looping or the occurrence of excessive tape-tension forces, can neither be eliminated by a tape-tension-control device having a tape-tension sensor and operating during threading-out, due to the limited displacement range of the tape-tension sensor.

SUMMARY OF THE INVENTION

It is the object of the invention to eliminate looping during change-over between search modes in the forward direction and in the reverse direction and from a search mode to a normal mode or the stop mode. The threading-out is started to return the tape into the cassette when occurrence of excessive tape-tension forces and looping is precluded. In the first operating position of the tape-guide device the second tape-guide on the pivotable lever is held in its first relative position defined by the actuating-cam surface. In the second operating position the second tape-guide can be positioned in its second relative position, which is defined by the position stop under the influence of the spring. The second tape-guide is movable out of its second relative position against the force of the spring by the tape-tension forces. As the second tape-guide, when it is in its second position relative to the supporting ring, i.e. in the threaded-in condition in which a tape is wrapped around and guided by this tape-guide, can be moved out of its second relative position against the spring force by the tape-tension forces exerted on it, it is set to a position which depends on the prevailing tape-tension force. From this position it is moved towards the second relative position under the force of the spring when the tape-tension forces decrease, which precludes the formation of loops, and from which it can be moved further away from the second relative position against the force of the spring in the case of a tape-tension increase, so that no excessive tape-tension forces can occur. The second tape-guide, which does not form part of a tape-tension-control device, is movable over a comparatively large range in comparison with a tape-tension sensor of a tape-tension-control device, so that this tape-guide can also compensate for comparatively large loops and tape-tension increases, which cannot be handled by a tape-tension sensor of a tape-tension-control device as a result of its limited displacement range. Thus, during change-over between search modes in the forward direction and in the reverse direction and from a search mode to a normal mode or the stop mode no loops are formed in the tape, whereby it cannot slip off the tape-guide elements because the loops are compensated for by a movable second tape-guide which maintains an adequate tension in the tape. When the tape is threaded out to return it into the cassette the synchronization of the instants at which the drive of the reel taking up the tape and the drive of the supporting ring are started is less critical, because loops or tape-tension increases which may be caused by a less accurate synchronization are compensated for by means of the movable second tape-guide.

The lever can be pivotally mounted by means of a spindle which extends through a bore, enabling the lever to be pivoted only relative to supporting ring, but this imposes restrictions on the construction of the actuating-cam surface which cooperates with the cam-follower on the lever. It is found to be advantageous if the lever carrying the second tape-guide is pivotally mounted by means of a pin-and-slot coupling. In this way the lever cannot only perform a pivotable movement but can also perform a sliding movement in the same direction as that in which the slot is oriented, thus providing an additional degree of freedom in the construction of the actuating-cam surface.

The lever, which is pivotally mounted as described in the foregoing, may be loaded by, for example, tension springs or leg springs, but this requires a comparatively large amount of space. It is advantageous if a compression spring arranged substantially perpendicularly to the pin and supported at the slot side acts on the pin of the pin-and-slot coupling. This results in a very compact construction and has the additional advantage that the angular range through which the lever can be pivoted is not limited by the spring.

DETAILED DESCRIPTION OF THE PREFERRED EMBODIMENT

Figure 1:
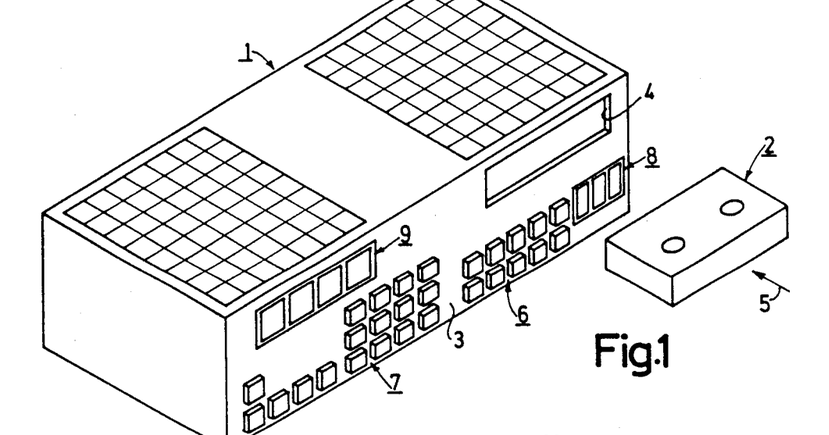
FIG. 1 is a reduced-scale diagrammatic perspective view of a recording and reproducing apparatus for video signals and audio signals.

FIG. 1 shows a recording and reproducing apparatus 1 intended for recording and reproducing video signal(s) and audio signals on/from a magnetizable record carrier in the form of a tape, briefly referred to hereinafter as "magnetic tape". The magnetic tape is accommodated in a rectangular cassette 2, shown schematically in FIG. 1, which contains two juxtaposed reel hubs which together with flanges, not shown, constitute reels between the magnetic tape extends, which cassette can be inserted by hand into the apparatus 1 through an opening in the front wall 3 of the housing of the apparatus in the direction indicated by the arrow 5. When the cassette 2 is inserted into the apparatus it is sled into a movable cassette-holder means which after complete insertion of the cassette into the apparatus enables the cassette to be lowered into an operating position, shown schematically in FIG. 2, initially parallel and subsequently perpendicularly to the main walls of the cassette. For selecting the modes of operation of the apparatus, such as "recording", "normal forward reproduction", "normal reverse reproduction", "still reproduction", "fast forward reproduction", "fast reverse reproduction" and the like, and for selecting operating functions such as "actuation of the cassette holder means", "actuation of the tape-guide device" and the like, the apparatus 1 comprises a first set 6 of keys on the front panel 3. For programming the apparatus and entering further data, for example setting a daytime clock, the apparatus 1 comprises a second set 7 of keys on the front panel 3. Further, the front panel 3 of the apparatus 1 is equipped with two display units 8 and 9 whose display elements comprise, for example, seven segments each and which serve, for example, for displaying the counter positions of a tape-length counter and for daytime display.

As stated, a cassette 2 inserted in the apparatus is lowered into an operating position. As is shown diagrammatically in FIG. 2, two winding spindles 14 and 15 then cooperate with the two juxtaposed rotatable reel hubs 10 and 11 between which the magnetic tape 12 extends partly within the cassette 2, as is indicated by a dash-dot line 13, and on which the magnetic tape can be wound selectively and in opposite directions depending on its instantaneous transport direction, as is indicated by the arrows 10a and 11a, so that the two reel hubs 10 and 11 which are coaxially mounted on the winding spindles 14 and 15 can be rotated by means of these spindles. For driving the two winding spindles 14 and 15 there is provided a drive means 16, shown schematically in FIG. 2, comprising a fixed drive wheel 17 which can be driven in opposite directions of rotation by means of a motor and a pivotable drive wheel 18 which can be driven by said drive wheel 17 and which depending on its direction of rotation can cooperate selectively with one of the two reel disks 19 and 20 which are rigidly connected to the winding spindles 14 and 15 to drive these reel disks.

Figure 2:
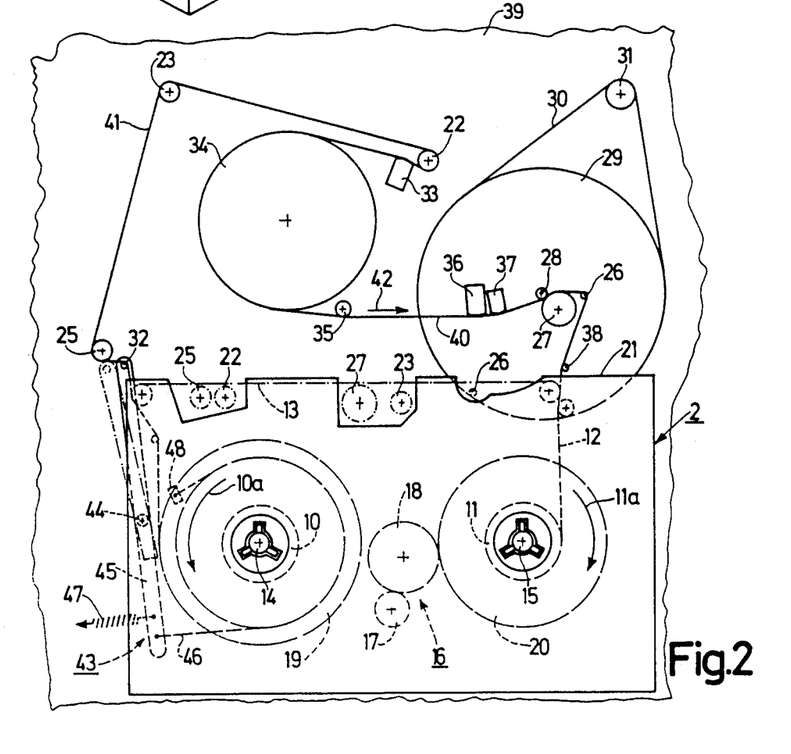
FIG. 2 shows diagrammatically in plan view a part of the apparatus containing a cassette in its operating condition with the tape withdrawn and wrapped around a guide drum.
Figure 3:
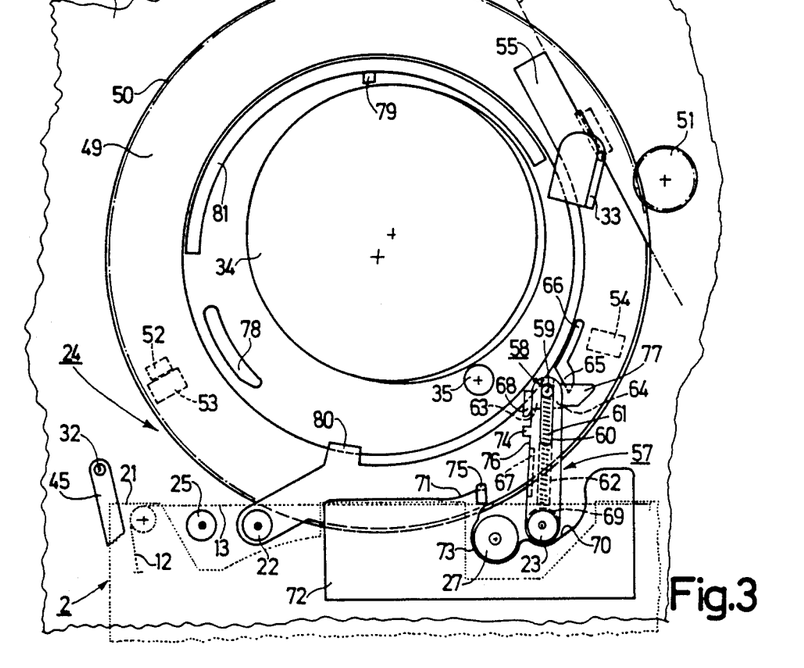
FIG. 3 shows in plan view the tape-guide device in its first operating position.
Figures 6, 7:
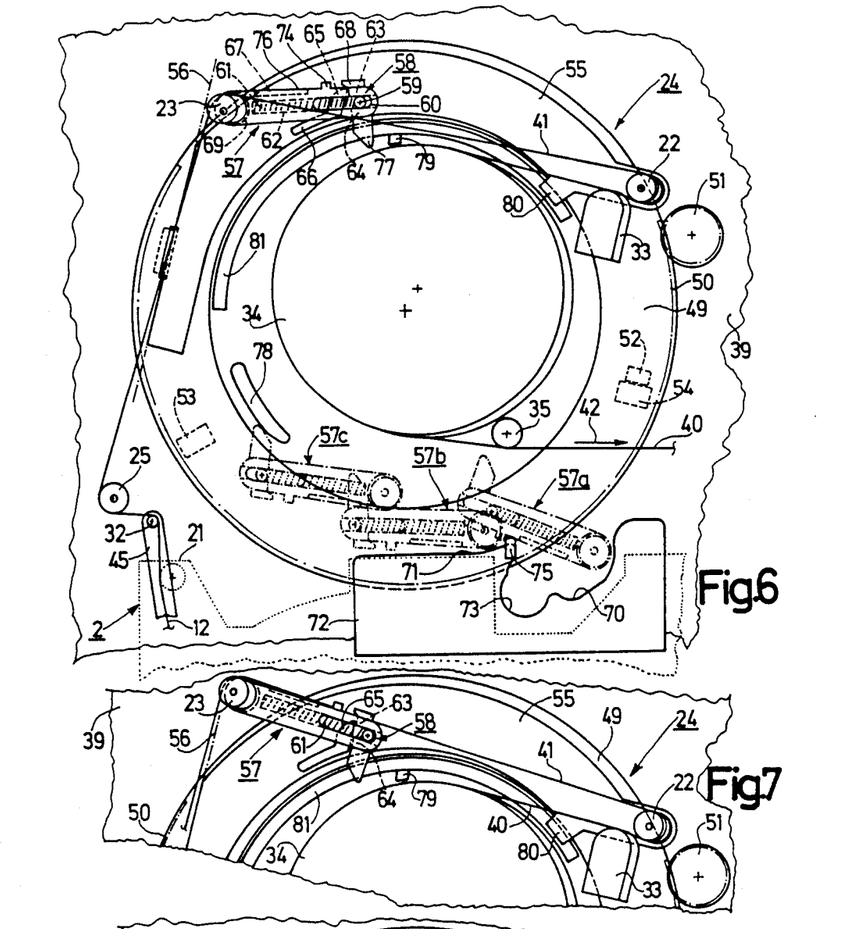
FIG. 6, shows in plan view the tape-guide device in its second operating position with the second tape-guide being held in position by the tape-tension force to which it is subject in normal operation.
FIG. 7, shows in plan part of the tape-guide device in its second operating position, the second tape-guide being subjected to a tape tension force which is smaller than in normal opertion.
Figure 8:
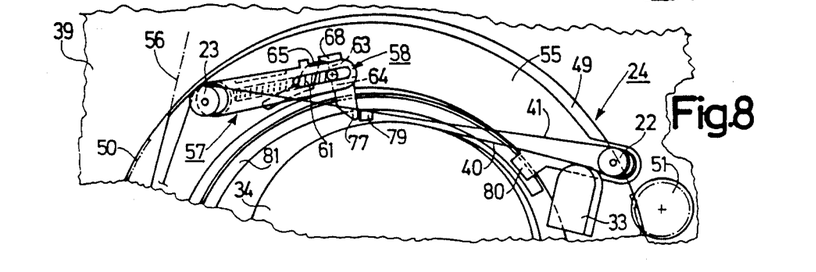
FIG. 8 shows in plan a part of the tape-guide device in its second operating position, the second tape-guide being subjected to a tape-tension force which is larger than in normal operation.

When the cassette 2 is lowered into its operating position a cassette shutter, not shown, and arranged at the front 21 of this cassette is opened to expose a cassette opening in the front side 21, and a first tape-guide 22 and a second tape-guide 23 of a tape-guide device 24 which is shown in detail in FIGS. 3, 6, 7 and 8 and which is movable between a first operating position shown in FIG. 3 and a second operating position shown in FIGS. 6, 7 and 8, a further movable tape-guide 25, a movable tape-guide pin 26 and a pressure roller 27, which are all in a first operating position shown in dash-dot lines, enter three recesses in the cassette 2 to engage behind a portion of the magnetic tape 12 indicated by the dash-dot line 13. Once the cassette has been lowered into its operating position, the tape-guides 22, 23 and 25 and the tape-guide pin 26 are each movable to their second operating position indicated in full lines in FIG. 2, the pressure roller 27 being also movable into an intermediate position, not shown in FIG. 2, in which the pressure roller 27 is situated in the direct proximity of a capstan 28. The magnetic tape 12 is then extracted from the cassette 2 through the opening in the front side 21 of the cassette. From this intermediate position the pressure roller 27 is movable into its operating position indicated in full lines in FIG. 2, in which it presses the magnetic tape 12 against the capstan 28. For driving the capstan 28 this capstan is coaxially connected to a flywheel 29 which can be driven by a drive wheel 31 via belt 30, which drive wheels can be driven in opposite directions of rotation by a motor. Since the devices for opening the cassette shutter, for actuating the further adjustable tape-guide, the tape-guide pin and the pressure roller and for pressing the pressure roller against the capstan are not relevant to the present invention, the devices are not shown for the sake of simplicity.

After the tape-guides 22, 23 and 25 and the tape-guide pin 26 as well as the pressure roller 27 have been set to their operating positions indicated in full lines in FIG. 2, the path of the magnetic tape 12 is as indicated by a full line in FIG. 2. The magnetic tape 12 then extends from the reel hub 10 to the reel hub 11 via two tape-guides arranged in the cassette, a tape-tension sensor pin 32, the movable tape-guides 25, 23 and 22, a stationary magnetic head 33 for erasing all the signals recorded on the magnetic tape, a two-part tape-guide drum 34 comprising the rotatable magnetic heads for recording and reproducing television signals in and from adjoining tracks which are inclined relative to the longitudinal direction of the magnetic tape, a stationary tape-guide 35, a stationary magnetic head 36 for erasing audio signals recorded in an audio track which extends in the longitudinal direction of the magnetic tape, a further stationary magnetic head 37 for recording and reproducing audio signals in/from the audio track and for recording and reproducing synchronizing signals in/from a synchronization track which extends in the longitudinal direction of the magnetic tape parallel to and adjacent the audio track, the capstan 28, against which the magnetic tape 12 is pressed by the pressure roll 27, the movable tape-guide pin 26, a stationary tape-guide 38, and two further tape-guides arranged in the cassette. It is to be noted that the tape-guide arm 34, the magnetic head 33 and the two tape-guides 22 and 23, which are both in their second operating positions and which in their first operating positions extend perpendicularly to a deck plate 39 of the apparatus, are inclined relative to the deck plate 39, but for the sake of simplicity this is not shown in FIG. 2. All the other drive, guide and scanning elements which cooperate with the magnetic tape extending perpendicularly to the deck plate 39. By means of said inclined arrangement it is achieved, in known manner, that the magnetic tape 2, when extracted from the cassette which is in operating position, extends along a helical path on the circumferential surface of the tape-guide drum 34. As is apparent from FIGS. 2, 6, 7 and 8 the first tape-guide 22 keeps the magnetic tape 12 wrapped around the tape-guide drum 34 in the second operating position of the tape-guide device 24, a first portion 40 of the magnetic tape 12 extending from the cassette 2 to said first tape-guide 22 via the tape-guide drum 34 and a second portion 41 of the magnetic tape 12 extending from said first tape-guide 22 to the cassette 2. The second tape-guide 23 keeps the second portion 41 of the magnetic tape 12 clear of the tape-guide drum 34.

When the lace-up of the magnetic tape it as described in the foregoing, video signals and audio signals can be recorded and reproduced in known manner. The magnetic tape 12 is then driven with a constant speed by the rotating capstan 28 in conjunction with the pressure roller 27 either in the forward direction, as is indicated by an arrow 42, or in the reverse direction, i.e. in a direction opposite to that indicated by the arrow 42. In order to search signals recorded on the magnetic tape at specific locations, the magnetic tape can also be driven with a speed higher than during normal recording or reproduction in the forward direction 42 or in the reverse direction while at the same time the signals recorded on the magnetic tape are reproduced, this process being generally referred to as a "search mode". Depending on the direction of transport of the magnetic tape 12 one of the two reel disks 20 or 19 is driven via the drive means 16 to take up the magnetic tape, the driving torques transmitted to the reel disks being determined by a friction-clutch device in the drive mechanism 16 and the speed of the drive wheel 18 during normal operation being smaller than in the search mode. Searching for a specific passage on the magnetic tape is attended by changing-over between the forward search mode and the reverse search mode and once a desired passage has been found, from the last search mode to normal operation, i.e. normal reproduction, or a stop mode, in order to stop the magnetic tape at the desired location of the magnetic tape, the pivotable drive wheel 18 being switched from one reel disk to the other reel disk and/or from a higher speed to a lower speed after every change-over. During changing-over the dynamic behaviour of each of the tape rolls, which depends on the length of tape contained on each reel hub, is practically out of control for a short time, suddenly causing too much magnetic tape being unwound from the tape rolls, so that undefined tape-tension conditions arise, which may result in looping of the tape. How such looping of the tape is precluded in the apparatus in accordance with the invention will be described in detail hereinafter.

When in the present apparatus the magnetic tape is driven in the forward direction 42 the tape tension is controlled by means of a tape-tension-control device 43 shown diagrammatically in FIG. 2. This tape-tension-control device comprises a lever 45 which is pivotable about a spindle 44 and which carries a tape-tension sensor pin 32 on one of its ends and whose other end is connected to a brake band 46 and a tension spring 47, which brake band partly surrounds the cylindrical surface of the reel disk 19. The brake band 46, of which one end is connected to the lever 45, is secured to a point of attachment 48 on the apparatus with its other end. The tape tension of the magnetic tape 12 which is driven in the forward direction 42 can be controlled in known manner by means of the tape-tension-control device 43, the tape-tension-sensor pin 32 being moved against the force of the tension spring 47 by the magnetic tape 12 when the tape tension increases, causing the breaking action of the brake band 46 on the reel 19, which rotates in a direction opposite to that indicated by the arrow 10a, to be reduced, which results in a reduction of the increasing tape tension, and the tape-tension sensor pin 32 being pressed against the magnetic tape 12 under the influence of the tension spring 47 when the tape tension decreases causing the braking action of the brake band 46 on the reel disk 19, which is driven in a direction opposite to that indicated by the arrow 10a, to be increased, which results in an increase of the decreasing tape tension. In this way the tape tension is kept within a nominal range dictated by the force of the tension spring. In this respect it is to be noted that during tape-tension control the tape-tension sensor pin 32 performs only small displacements in order to vary the frictional contact between the brake band 46 and the circumferential surface of the reel disk 19.

In the present apparatus the tape-tension-control device 43 is movable from the operating position shown in full lines in FIG. 2 to a rest position indicated in dash-dot lines in FIG. 2, in which the brake band 46 is entirely clear of the circumferential surface of the reel disk 19, thereby rendering the tape-tension-control device completely inoperative. The tape-tension-control device is set from its operating position to its rest position both when the magnetic tape is driven in the reverse direction, i.e. in a direction opposite to that indicated by the arrow 42, and also directly at the beginning of a threading-out operation, i.e. when the first and second tape-guides 22 and 23 of the tape-guide device 24 begin to move from their second operating positions indicated in full lines in FIG. 2 to their first operating positions indicated in dash-dot lines in FIG. 1. It is to be noted that the tape-tension-control device 43 need not necessarily be movable to a rest position; when the magnetic tape is driven in the reverse direction and when the magnetic tape is threaded out the device may also remain in the operating position shown in full lines, because under these operating conditions the reel disk 19 is driven in the direction indicated by the arrow 10a, so that the brake band 46 exerts only a very moderate braking action on the reel disk 19 and consequently the tape-tension-control device is rendered almost inoperative anyway. Further, it is to be noted that it is possible to employ a tape-tension-control device which provides tape-tension-control in either direction of tape transport; such a tape-tension-control device may also provide tape-tension control during a threading-out operation or it may be set to a rest position in which it is inoperative at the beginning of a threading-out operation. However, alternatively the apparatus may be constructed without tape-tension-control device, in which case the tape-tension forces depend on the driving and braking torques exerted on the reel disks.

For extracting the magnetic tape 12 from the cassette 2, wrapping it around the tape-guide drum 34, and returning it into the cassette, the apparatus 1, as stated in the foregoing, comprises a tape-guide device 24, described in detail with reference to FIGS. 3 to 8. The tape-guide device 24 is movable between a first operating position shown in FIG. 3, which position corresponds to the threaded-out condition of the magnetic tape, and a second operating position shown in FIGS. 6 to 8, which position corresponds to the threaded-in condition of the magnetic tape. The tape-guide device 24 comprises a substantially disk-shaped supporting ring 49 which surrounds the tape-guide drum 34, which is rotatable relative to the deck plate 39 and which has teeth 50 on a part of its outer circumference, which teeth are in mesh with the gear wheel 51 which can be driven by a motor. The gear wheel 51 is driven via a self-locking mechanism, not shown, such as a worm gear or a differential gear, so that the tape-guide device 24 is retained in its instantaneous operating position via the supporing ring 49, the teeth 50 of this ring, the gear wheel 51 and the self-locking gear mechanism. In order to define the two operating positions of the tape-guide device 24, the supporting ring 49 comprises a projection 52 on its side which faces the deck plate 39, which projection abuts against a first upwardly projecting limiting stop 53 on the deck plate 39 in the first operating position of the tape-guide device 24 and which abuts against a second upwardly projecting limiting stop 54 on the deck plate 39 in the second operating position of the tape-guide device 24.

The supporting ring 49 carries the first tape-guide 22 and the second tape-guide 23. For this purpose a crescent-shaped plate 55 is mounted on the supporting ring 49 for pivotal movement about a pivotal axis 56 which extends parallel to the disk plane of the supporting ring 49, which plane extends parallel to the plane of the deck plate 39. The plate 55 is spring-loaded towards the supporting ring 49 and its angular free end portion carries the first tape-guide 22 constructed as a rotatable tape-guide roller provided with guide flanges. The second tape-guide 23, which is constructed as rotatable, pivotally mounted tape-guide roller provided with flanges, is arranged on a spring-loaded bar-shaped lever 57 which is shown in detail in FIGS. 4 and 5 and which is pivotally mounted on the plate 55 and is thus supported by the supporting ring 49.

Figure 4:
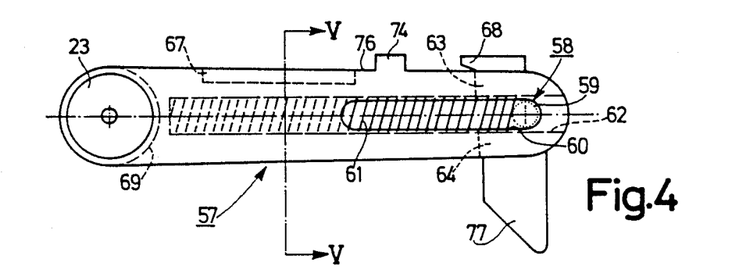
FIG. 4 shows the lever carrying the second tape-guide in a plan view.
Figure 5:
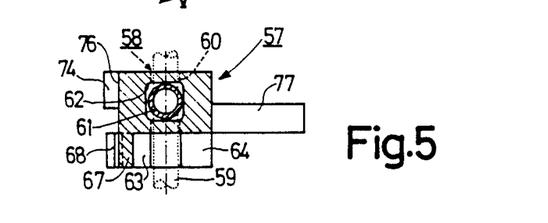
FIG. 5 is a sectional view of the lever carrying the second tape-guide, taken on the line V—V in FIG. 4.

The pivotal lever 57 carrying the second tape-guide 23 is pivotally mounted on the plate 55 by means of a pin-and-slot coupling 58 comprising a pin 59 mounted in the plate 55 and an elongate through-going hole in the form of a slot 60 in the lever 47. A compression spring 61, which is provided for loading the lever 57, which is supported at the slot side, and which is arranged perpendicularly to the pin 59 acts on the pin 59 of the pin-and-slot coupling 58. For supporting the pressure spring 61 at the slot side the lever 57 is formed with channel-shaped recess 62 which is open at one side and which extends in the same direction as the slot 60, the compression spring 61 acting against the closed end of said duct in the lever 57. It is to be noted that it is also possible to use a pin-and-slot coupling comprising a pin connected to the lever and a slot formed in the plate; in that case it is also possible to provide a compression spring which acts on the pin and which bears against the plate in which the slot is formed.

Near the end which is remote from the second tape-guide 23 the lever 57 comprises a U-shaped extension which projects downwardly towards the plate 55 and which has two limbs 63 and 64 which each constitute a positioning stop. The positioning stops 63 and 64 are provided to cooperate with a counter-stop 65 which is secured to the plate 55 and which is thus arranged on the supporting ring 49, for positioning the lever 57 in a predetermined position relative to the supporting ring. The counter-stop 65 is constituted by the short limb of a substantially L-shaped member which projects upwardly from the plate 55 towards the lever 57. The long limb 66 of this substantially L-shaped member serves to cooperate with a strip 67 which projects downwardly from the lever 57 towards the plate 55 for limiting a pivotal movement of the lever 57 in the anti-clockwise direction when the magnetic tape 12 is extracted from the cassette and is returned into the cassette 2. The limb 63 which functions as a positioning stop comprises a lateral projection 68 which is constructed in such a way that together with the free end of the limb 63 facing the counter-stop 65 it constitutes a hook by which the lever 57 can abut against the free end of the counter-stop 65.

Further the lever 57 comprises four cam followers which are constructed to cooperate with a plurality of actuating-cam surfaces. A first cam follower is constituted by a cylindrical projection 69 which projects downwardly from the lever 57 towards the plate 55 and which is disposed substantially coaxially with the second tape-guide 23. This projection 69 cooperates with two actuating-cam surfaces 70 and 71, which are formed on a cam plate 62 connected to the deck plate 39 and which are spaced from each other by a recess 73 formed in the cam plate 72 to receive the pressure roller 27. A second cam follower is constituted by a rectangular lateral projection 74 on the lever 57. This projection 74 cooperates with an upward projection 75 which is provided on the cam plate 70 at one end of the actuating cam surface 71 and which functions as an actuating cam surface. This projection 75 further cooperates with the side wall 76 of the lever 57, which thus constitutes a third cam follower. A fourth cam follower is constituted by a plate-shaped lateral projection 77 on the lever 57. This projection 77 cooperates with an actuating cam surface formed by an upward projection 78 on the deck plate 39. The plate-shaped projection 77 performs another function, i.e it is adapted to cooperate with a limiting stop 79 which projects upwardly from the deck plate 39 to limit a possible anti-clockwise pivotal movement of the lever 57 when the tape-guide device 24 is in its second operating position.

In the first operating position of the tape-guide device 24 as can be seen in FIG. 3, the second tape-guide 23, which is pivotally mounted on the lever 57, is held in the first position relative to the supporting ring 49, which first relative position is defined by the actuating cam surface 70, in that this cam surface 70 acts on the cylindrical projection 69 the lever 57, the projection 69 being urged into a trough-shaped recess in the actuating-cam surface 70 under the influence of the compression spring 61. In order to withdraw the magnetic tape from the cassette 2 and to wrap it around the tape-guide drum 34 the tape-guide device 24 is driven in the clockwise direction, the reel disk 20 being braked and the magnetic tape 12 being pulled off the tape roll corresponding to the reel disk 19, the tape-tension conditions being determined by the friction conditions and the mass of the tape roll. In order to move the tape-guide device 24 out of its first operating position the supporting ring 49 is driven in the clockwise direction, so that this ring directly drives the plate 55 carrying the first tape-guide 22, which pulls a loop of magnetic tape 12 out of the cassette 2 and the pin 59. The pin 59 pivots the lever 57, the cylindrical projection 69 of the lever 57 remaining initially in engagement with the actuating-cam surface 70. The pin 59 then slides along the slot 60, at the same time compressing the compression spring 61. As a result of its pivotal movement the lever 57 abuts against the projection 75 of the cam plate 72 with its side wall 76 carrying the projection 74, so that during further rotation of the supporting ring 49 the projection 69 of the lever 57 is lifted off the actuating-cam surface 70; in FIG. 6 this position of the lever 57 is indicated in dash-dot lines and bears the reference numeral 57a. As the supporting ring 49 is rotated further the side wall 76 of the lever 57 slides over the projection 75 of the cam plate 72, again resulting in a relative movement between the pin 559 and the slot 60, the compression spring 71 now being relaxed. During the above cycle of operations the positioning stops 63 and 64 of the lever 57 are positioned opposite to the counter stop on the plate 55, the spring 61 tending to bring the positioning stops 63 and 64 in abutment against the counter-stop 65, but this is prevented by the side wall 76 which abuts against the projection 75. As the rotation of the supporting ring 49 continues the side wall 76 slides off the projection 75, after which the cylindrical projection 69 of the lever 57 is brought into engagement with the actuating-cam surface 71 of the cam plate 72 under the influence of the compression spring. In FIG. 6 this position of the lever 57 is shown in dash-dot lines and bears the reference numeral 57b. As the rotation of the supporting ring 49 continues the plate-shaped projection 77 of the lever 57 engages with the cam surface 78, which keeps the lever 57 in such a position in opposition to the force of the compression spring 61 that the positioning stops 63 and 64 cannot abut against the counter-stop 65. In FIG. 6 this position of the lever 57 is shown in dash-dot lines and bears the reference numeral 57c. As the supporting ring 49 is rotated further, the projection 77 slides off the cam surface 78, the tape tension force exerted on the second tape-guide 23 holding the lever 57 in such a postion against the force of the compression spring 61 that the positioning stops 63 and 64 cannot abut against the counter-stop 65. If high tape-tension forces occur as a result of a temporary fault condition, for example temporary jamming of the magnetic tape after the projection 77 has slid off the cam surface 78 and these forces cause the second tape-guide 23 and the lever 57 to be pivoted anti-clockwise, this pivotal movement is limited in that the strip 67 of the lever 57 abuts against the long limb 66 of the L-shaped member, whose short limb 65 constitutes the counter-stop for the positioning stops 63 and 64. The drive of the supporting ring 49 ceases as soon as the tape-guide device 24 has reached its second operating position.

It is to be noted that during the afore-mentioned rotation of the supporting ring 49 a tab 80, which is laterally offset from the plate 55 towards the tape-guide drum 34, engages with against a ridge-shaped cam surface 81 which is coaxial with the supporting ring 49. The cam surface 81 is formed on the deck plate 39 and it rises relative to the deck plate 39 in the clockwise direction. As a result of the engagement of the tab 80 with the cam surface 81 the plate 55 is pivoted away from the supporting ring 49 against its spring load, so that when the tape-guide device 24 is in its second operating position the two tape-guides 22 and 23 on the plate 55 are set to positions which are inclined relative to the deck plate 39, as is shown in full lines in FIG. 6.

FIG. 6 shows the second tape-guide 23 in an operating position which it occupies during normal tape-tension conditions. The hook formed by the positioning stop 63 and its projection 68 then abuts against the free end of the counter-stop 65. In practice, normal tape-tension conditions cover, for example, a range of tape-tension forces between approximately 20 lbf and 90 lbf. If the tape-tension forces become smaller than said lower limit the tape-guide 23 on the lever 57 is pivoted clockwise under the influence of the compression spring 61, so that no tape loops can be formed. This pivotal movement can continue unitl the positioning stops 63 and 64 of the lever 57 are in abutment with the flat bounding surface of the counter-stop 65, in which cases the second tape-guide 23 is positioned in a second position relative to the supporting ring 49, which position is defined by the positioning stops 63 and 64 in conjunction with the counter-stop 65. This situation is illustrated in FIG. 7. If the tape-tension forces exceed said upper limit the second tape-guide 23 is pivoted anti-clockwise out of the operating position shown in FIG. 6 against the force of the compression spring, which precludes the occurrence of excessive tape-tension forces. This pivotal movement can continue until the plate-shaped projection 77 of the lever 57 abuts against the limiting stop 79. This situation is illustrated in FIG. 8.

As can be seen from FIGS. 6 to 8, when the tape-guide device 24 is in its second operating position the second tape-guide 23 can be positioned in its second position relative to the supporting ring 49, as is illustrated in FIG. 7, under the influence of the compression spring 61, which second relative position is defined by the position stops 63 and 64 in conjunction with the counter-stop 65, and it can be moved out this second relative position against the force of the compression spring 61 by the tape-tension forces exerted on it by the magnetic tape 12, as is illustrated in FIGS. 6 and 8. The second tape-guide is movable over a comparatively large range which is approximately 30° in the present apparatus. This large range has the advantage that by means of the second tape-guide comparatively large tape loops and tape-tension increases can be compensated for.

During a normal recording or reproducing mode and during a search mode the second tape-guide always assumes its operating position shown in FIG. 6. During change-over between a search mode in the forward direction and a search mode in the reverse direction and during change-over from a search mode to a normal reproduction mode the tape-tension force, as already explained in the foregoing, briefly decreases strongly as a result of the change-over of the drive system for the magnetic tape and the dynamic behaviour of the tape rolls, the second tape guide being moved clockwise out of the operating position shown in FIG. 6 under the influence of the compression spring, so that the magnetic tape is always tensioned adequately, which precludes looping of the tape and consequently ensures that the magnetic tape cannot slip off the tape-guide and scanning elements cooperating with this tape. It is to be noted that the formation of such a tape loop as a result of change-over between search modes or switching-off of a search mode cannot be eliminated by means of the tape-tension-control device 43, because its tape-sensor pin has a displacement range which is too small for this purpose.

In order to return the magnetic tape 12 into the cassette when it is in the threaded-in condition shown in FIG. 6, the tape-guide device 24 is driven in the anti-clockwise direction, the reel disk 20 being braked and the reel disk 19 being driven in the direction indicated by the arrow 10a to take up the magnetic tape. The instant at which the drive of the tape-guide device 24 is started and the instant at which the drive of the reel disk 19 is started should then be synchronised as accurately as possible in order to looping of the tape or the occurrence of excessive tape-tension forces, as already explained at the beginning. In the present invention this synchronisation is less critical. Should the drive of the tape-guide device 24 be started prematurely as compared with the drive of the reel disk 19, this will result in a decrease in tape-tension causing a displacement of the second tape-guide 23 out of its operating position shown in FIG. 6 under the influence of the compression spring 61, so that even in this situation the second tape-guide 23 ensures that the magnetic tape 12 remains always adequately tensioned, which precludes looping of the tape. However, if the drive of the reel disk 19 is started prematurely relative to the drive of the tape-guide device 24, which results in an increasing tape tension, the second tape-guide 23 is pivoted anti-clockwise against the force of the compression spring 61, so that the occurrence of excessive tape-tension forces is thus precluded. Owing to its large displacement range, the second tape-guide also in this case enables comparatively large tape loops and comparatively large tape-tension increases to be compensated for, which cannot be eliminated by means of a tape-tension control device as a result of the limited displacement range of this device.

In order to set the tape-guide device 24 from its second operating position to its first operating position, the supporting ring 49 is driven anti-clockwise. The second tape-guide 23 is then kept out of its second relative position by the driven magnetic tape 12. As the supporting ring 49 is rotated further the lever 57 together with the second tape-guide 43 consecutively assumes the positions 57c, 57b and 57a shown in FIG. 6, the first tape-guide 22 returning the magnetic tape 12 as a loop into the cassette. In position 57a the projection 74 of the lever 57 abuts against the projection 75 of the cam plate 72, so that a pivot is obtained about which the lever 57 is pivoted in the clockwise direction, causing the cylindrical projection 69 to engage with the actuating-cam surface 70. When the tape-guide device 24 has reached its first operating position the second tape-guide 23 on the lever 57 again assumes its first position relative to the supporting ring 49 as defined by the actuating cam surface 70, after which the drive of the supporting ring 49 is discontinued.

What is claimed is:

1. A recording and/or reproducing apparatus (1) for a record carrier (12) in the form of a tape which is contained in a cassette (2) which can be brought into an operating position in the apparatus and which record carrier can be extracted from said cassette, comprising a tape-guide drum (34) around which, over at least a part of its circumferential surface, the record carrier (12) extracted from the cassette (2) in its operating position can be wrapped along a helical path, a tape-guide device (24) which is movable between a first and a second operating position, for withdrawing the record carrier (12) from the cassette (2) and wrapping it around the tape-guide drum (34) and for returning the record carrier (12) into the cassette (2), which tape-guide device comprises a rotatable supporting ring (49) which surrounds the tape-guide drum (34) and which carries at least two tape guides (22, 23) which in the first operating position of the tape-guide device (24) engage behind the record carrier (12) inside the cassette and of which tape guides in the second operating position of the tape-guide device (34) a first tape guide (22) keeps the record carrier (12) wrapped around the tape-guide drum (34), a first portion (40) of the record carrier (12) extending from the cassette (2) to said first tape guide (22) via the tape-guide drum (34) and a second portion (41) of the record carrier (12) extending from said first tape guide (22) to the cassette (2), and a second tape guide (23) keeps the second portion (41) of the record carrier away from the tape-guide drum (34), which second tape guide is mounted on a pivotable lever (57) which is loaded by a spring (61), which is arranged on the supporting ring (49), and which comprises at least one positioning stop (63,64) and at least one cam follower (69,74,76,77) which second tape guide in one of the two operating positions of the tape-guide device (24) is held in a first position relative to the supporting ring (49) via the lever (57) by means of an actuating-cam surface (70) on a cam plate (72) which cooperates with the at least one said cam follower (69) on the lever and in the other one of the two operating positions of the tape-guide device (24) can be positioned in a second position relative to the supporting ring (49) via the lever (57) under the influence of the spring (61) by means of a positioning stop (63,64) which then cooperates with a counter-stop (65) on the supporting ring (49), characterized in that the in first operating position of the tape-guide device (24) the second tape guide (23) on the pivotable lever (57) is held in its first relative position defined by the actuating-cam surface (70) and the in second operating position of the tape-guide device (24) the second tape guide (23) can be positioned in its second relative position, which is defined by the positioning stop (63,64) under the influence of the spring (61) and is movable out of its second relative position against the force of the spring (61) by the tape-tension forces exerted on it by the record carrier (12).

2. An apparatus as claimed in claim 1, characterized in that the pivotable lever (57) carrying the second tape-guide device (23) is pivotally mounted by means of a pin-and-slot coupling (58).

3. An apparatus as claimed in claim 2, characterized in that a compression spring (61) which is arranged substantially perpendicularly to the pin (59) and which is supported at the slot side acts on the pin (59) of the pin-and-slot coupling (58).

* * * * *